Dec. 29 1925
R. L. HERNDON ET AL
1,567,502
SHOCK ABSORBER
Filed Nov. 4, 1924
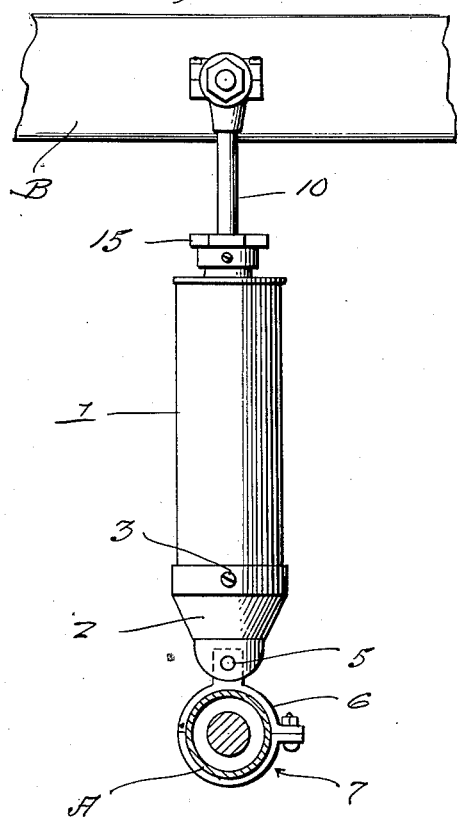
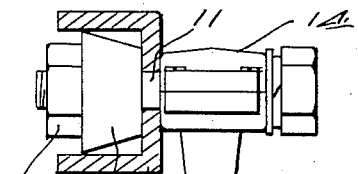
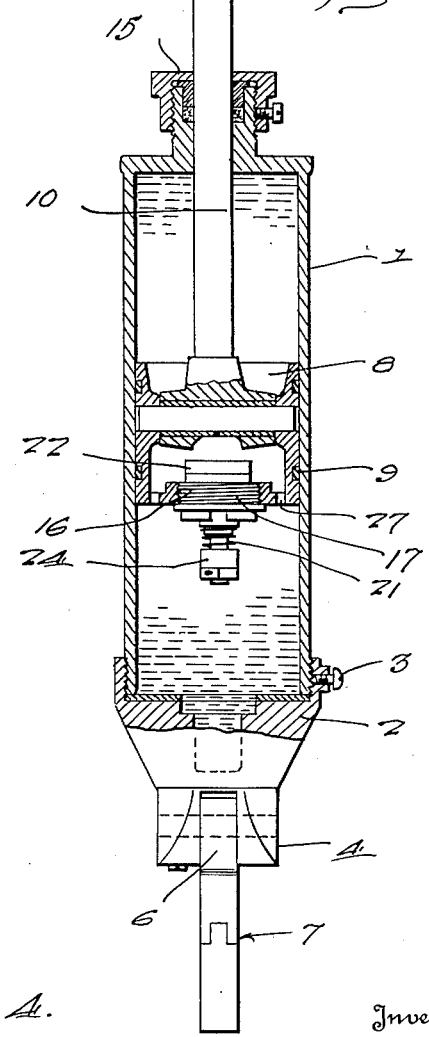
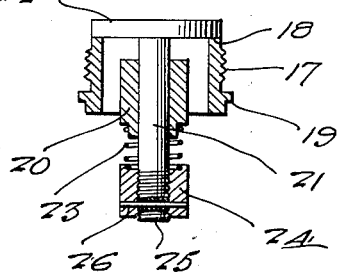
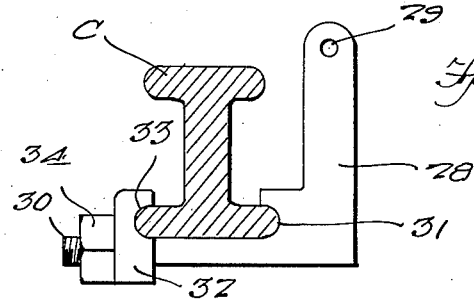
Inventors
R. L. Herndon
A. W. Herndon
By Clarence A. O'Brien
Attorney Patented Dec. 29, 1925.

1,567,502

UNITED STATES PATENT OFFICE.

ROY L. HERNDON AND ARTHUR W. HERNDON, OF POCAHONTAS, VIRGINIA.

SHOCK ABSORBER.

Application filed November 4, 1924. Serial No. 747,789.

*To all whom it may concern:*

Be it known that we, ROY L. HERNDON and ARTHUR W. HERNDON, citizens of the United States, residing at Pocahontas, in the county of Tazewell and State of Virginia, have invented certain new and useful Improvements in a Shock Absorber, of which the following is a specification.

This invention relates to improvements in shock absorbers and has for its principal object to provide a device which may be readily and easily attached in position on an automobile without necessitating any alterations of the parts of the automobile.

A further object of the invention is to provide a shock absorber of the above mentioned character which includes a piston adapted for reciprocatory movement within a cylinder in which is contained a suitable fluid, means being associated with the piston for permitting the flow of the fluid in the cylinder therethrough whereby the shock absorber will properly function.

A further object of the invention is to provide a shock absorber of the above mentioned character, which is simple in construction, inexpensive, strong and durable and furthermore adapted for the purposes for which it is designed.

Other objects and advantages of this invention will become apparent during the course of the following description.

In the accompanying drawing forming a part of this specification and in which like numerals designate like parts throughout the same:

Figure 1 is a side elevation of the shock absorber embodying our invention showing the same attached to the frame and rear axle of an automobile.

Figure 2 is an enlarged vertical sectional view with parts shown in elevation.

Figure 3 is a detail view of the valve, and

Figure 4 is a fragmentary detail view of the attaching bracket associated with the shock absorber for securing the same on the front axle of an automobile.

In the drawing, wherein for the purpose of illustration is shown the preferred embodiment of our invention, the numeral 1 designates the fluid containing cylinder the upper end thereof being closed, the lower end thereof being open and externally threaded. A closure cap 2 is threaded on the lower threaded end of the cylinder 1 and is further secured thereon by means of the set screw 3. The closure cap is provided with a bifurcated extension 4 and pivotally secured therein by means of the transversely extending pin 5 is the upper section 6 of the rear axle attaching clamp designated generally by the numeral 7. The manner in which the clamp 7 extends around the rear axle housing A of an automobile is more clearly illustrated in Figure 1.

Adapted for reciprocatory movement within the fluid containing cylinder 1 is the piston 8. The usual packing rings 9 are associated with the piston 8 as is clearly illustrated in Figure 2. A piston rod 10 is connected at its lower end to the piston 8 and the same extends upwardly through the cylinder and to the top thereof. The upper end of the piston rod 10 is supported on a bolt 11, the latter being adapted to extend through a suitable opening provided therefor in the side of the usual channel frame B of the automobile. A cone shaped member 12 is disposed over the threaded end of the bolt 11 and cooperates with the channel frame B in the manner clearly shown in Figure 2 for preventing any loose movement of the bolt 11 with respect to the frame. A nut 13 is threaded on the threaded end of the bolt and engages the cone shaped member 12 for rigidly securing the bolt in position on the frame. It is also to be understood that the upper end of the piston rod 10 is provided with a suitable bearing 14 for receiving the bolt 11. A packing gland shown generally at 15 is associated with the closed upper end of the fluid containing cylinder 1 and cooperating with the intermediate portion of the piston rod 10 for the purposes well known in the art.

The bottom of the piston 8 is provided with an enlarged threaded opening 16 which is arranged centrally thereof for detachably supporting therein the threaded ring 17, the upper edge of the ring 17 provides a valve seat 18 and an annular flange 19 is formed on the lower portion of the ring for engagement with the bottom of the piston in the manner clearly illustrated in Figure 2. A guide 20 is supported in the ring 17 in spaced relation with the inner wall of the ring by any suitable means and adapted to be received in the guide 20 is the valve stem 21.

A valve 22 is associated with the upper end of the valve stem 21 and cooperates with the valve seat 18. The valve 22 is normally held in engagement with the valve seat 18 by means of the coil spring 23 which encircles the lower portion of the valve stem 21 and is secured at its upper end to the lower portion of the valve guide 20, the lower end of the coil spring being associated with the upper portion of a nut 24 which is threaded on the lower threaded end 25 of the valve stem 21 and is held against displacement therefrom by means of the locking pin 26. The nut 24 may be adjusted on the lower threaded end 25 of the valve stem 21 for regulating the tension of the coil spring 23. Diametrically opposed by-passes 27 are provided in the bottom of the piston 8 as also clearly illustrated in Figure 2 of the drawing.

In Figure 4 is shown the attaching bracket which is adapted to be associated with the bifurcated extension 4 of the closure cap 2 when the shock absorber is attached to the front axle C of an automobile. The same comprises an angular member 28, the upper end of the vertically extending portion thereof being provided with an opening 29 for cooperation with the openings provided in the bifurcated end 4 of the cap and through which extends the transverse pin 5. The horizontal portion of the angular bracket 28 is adapted to extend across the bottom of the front axle C and the outer end thereof is threaded as illustrated at 30. The angular bracket 28 is further provided with a notched or cut out portion 31 for engagement with one of the lower edges of the front axle. The other lower edge is adapted to be engaged by a lug 32 which is removably supported on the horizontal portion of the angular bracket 28 and is also provided with the notch 33 similar to the notch 31 whereby the lugs may snugly fit around the lower edge of the front axle. A locking nut 34 is threaded on the threaded end 30 for holding the lug 33 in engagement with the front axle in the manner clearly illustrated in Figure 4.

The fluid contained within the cylinder 1 is preferably glycerin and normally the piston 8 is in the position as shown in Figure 2 of the drawing wherein the same is disposed within the cylinder intermediate the ends thereof. Upon the downward movement of the piston within the cylinder 1 when the wheels of the automobile travel over an obstruction, the fluid in the lower portion of the cylinder will force the valve 22 upwardly out of engagement with the valve seat 18 whereby the fluid will pass from the lower portion of the cylinder upwardly through the ring 17 and into the upper portion of the cylinder. Upon the return upward stroke of the piston within the cylinder, the spring 23 will close the valve 22 and the fluid in the lower portion of the cylinder will pass through the by-passes 27.

The provision of a shock absorber of the above mentioned character, will take up any of the shocks which are caused by the wheels of an automobile traveling over an uneven road and by providing a piston construction of the above mentioned character, the sudden return of the piston to its normal position will be checked. This will enable the occupants of the automobile to ride comfortably regardless of the condition of the road over which the automobile is traveling.

A shock absorber of the above mentioned character, will at all times be positive and efficient in its operation and the simplicity in which the same is constructed enables the several parts to be readily disassembled whenever it becomes necessary. Furthermore the shock absorber may be easily and readily attached in position on an automobile.

While we have shown the preferred embodiment of our invention, it is to be understood that various changes in the size, shape and arrangement of parts may be resorted to without departing from the spirit of the invention and the scope of the appended claims.

Having thus described the invention, what we claim as new and desire to secure by Letters Patent is:—

1. A shock absorber for automobiles comprising a fluid containing cylinder, means associated with the lower end of the cylinder for attaching the same to the axle of the automobile, a piston operable in the cylinder, the bottom thereof being provided with by-passes, a piston rod extending through the top of the cylinder and secured at its lower end to said piston, the upper end of the piston rod being secured to the frame of the automobile, a normally closed valve in the bottom of the piston, said valve comprising a ring threaded into a central opening provided in the bottom of the piston, a valve stem extending centrally through the ring, a valve carried by the upper end of the valve stem, the upper edge of the ring providing a valve seat for cooperation with the valve, and means associated with the valve stem at its lower end for normally holding the valve in engagement with the valve seat.

2. A shock absorber for automobiles comprising a fluid containing cylinder, means associated with the lower end of the cylinder for attaching the same to the axle of the automobile, a piston operable in the cylinder, the bottom thereof being provided with by-passes, a piston rod extending through the top of the cylinder and secured at its lower end to said piston, the upper end of the piston rod being secured to the frame of the automobile, a normally closed valve in the bottom of the piston, said valve comprising a ring threaded into a central opening provided in the bottom of the piston, a valve stem extending centrally through the ring, a valve carried by the upper end of the valve stem, the upper edge of the ring providing a valve seat for cooperation with the valve, means associated with the valve stem at its lower end for normally holding the valve in engagement with the valve seat, said last mentioned means including a coil spring encircling the lower portion of the valve stem, the upper end of the coil spring engaging the ring, and an adjusting nut threaded on the lower end of the valve stem for cooperation with the lower end of the coil spring.

3. A shock absorber for automobiles comprising a fluid containing cylinder open at its lower end, a closure cap for the open lower end thereof, means associated with the closure cap for attaching the cylinder to the axle of the automobile, a piston operable in said cylinder, the bottom of said piston having a centrally located threaded opening, and diametrically opposed by-passes formed therein, a piston rod extending through the top of the cylinder and secured at its lower end to said piston, the upper end of the rod being secured to the frame of the automobile, a ring threaded into the threaded opening provided in the bottom of the piston, the upper edge of said ring providing a valve seat, a valve stem extending centrally through said ring, a guide therefor, a valve on the upper end of the stem adapted for cooperation with the valve seat, a coil spring encircling the lower portion of the valve stem and engaging the bottom of the guide at one end, an adjusting nut threaded on the lower end of the valve stem for co-operation with the opposite end of the coil spring, said coil spring normally holding the valve in its closed position, said valve adapted to be opened when the piston moves downwardly in the cylinder to permit the fluid in the lower portion of the cylinder to pass upwardly through the ring into the upper portion of the cylinder, the valve adapted to be moved to a closed position when the piston moves upwardly in the cylinder and permitting the fluid to pass through the by-passes.

In testimony whereof we affix our signatures.

R. L. HERNDON.
A. W. HERNDON.